March 26, 1935. T. V. BUCKWALTER 1,995,838
ROLLER BEARING
Filed April 20, 1934
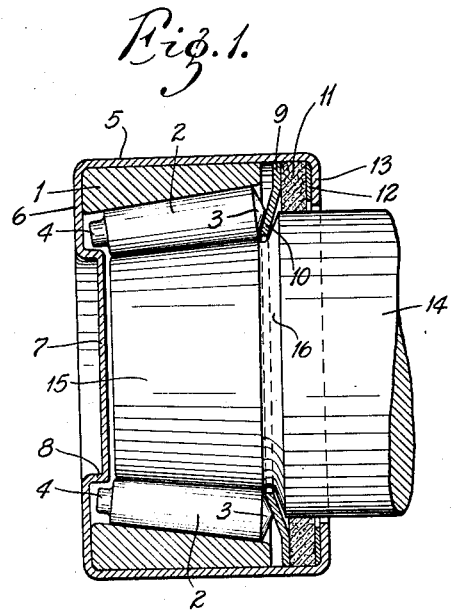
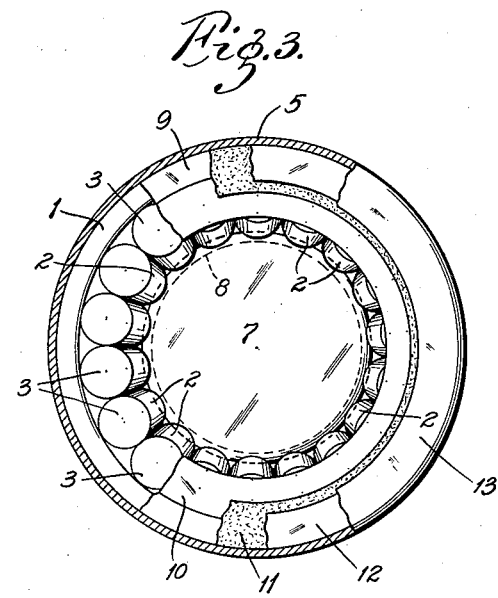
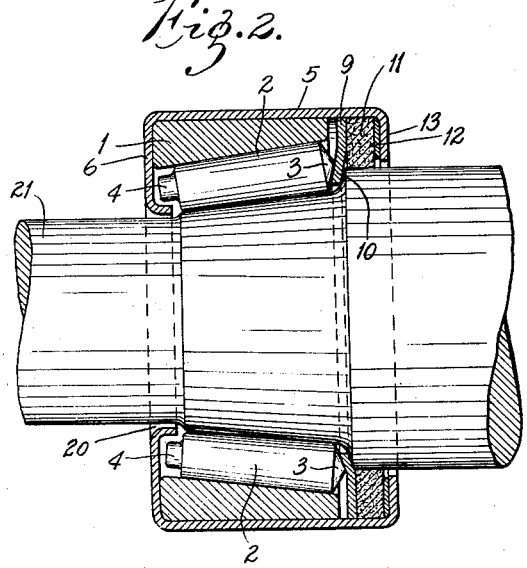
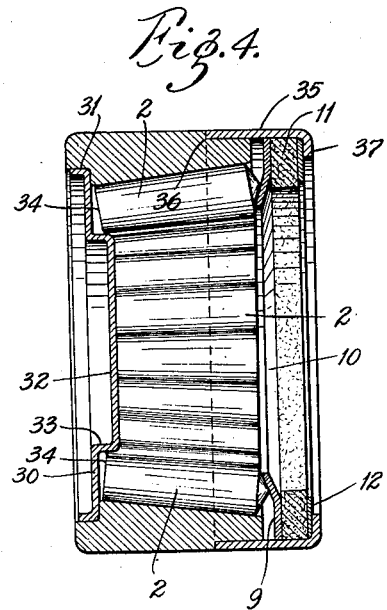
INVENTOR:
Tracy V. Buckwalter,
by Cantlen & Gravely,
HIS ATTORNEYS.

Patented Mar. 26, 1935

1,995,838

UNITED STATES PATENT OFFICE 1,995,838

ROLLER BEARING

Tracy V. Buckwalter, Canton, Ohio, assignor to The Timken Roller Bearing Company, Canton, Ohio, a corporation of Ohio Application April 20, 1934, Serial No. 721,456

6 Claims. (Cl. 308—214)

My invention relates to roller bearings of the kind wherein the rollers and the cup or outer bearing member form a self-contained assembly. It has for its principal object a simple assembly of this type which is capable of withstanding damage in shipment and which is easily installed. Another object is an assembly of this type having a full series of rollers.

The invention consists in the roller bearing and in the parts and combinations and arrangements of parts hereinafter described and claimed.

In the accompanying drawing,

Fig. 1 is a longitudinal sectional view of a bearing embodying my invention, mounted on the pin of a universal joint;

Fig. 2 is a similar sectional view of a modification, showing the bearing mounted on a shaft extending therethrough;

Fig. 3 is an end view of the bearing with portions of the assembly broken away; and Fig. 4 is a longitudinal sectional view of another modification.

In Figs. 1 and 2 is illustrated a cup or outer bearing member 1 and conical rollers 2 having conically shaped large ends 3 and pintles 4 projecting from their small ends. The bearing is of the full series type, that is as many rollers 2 are used as possible, adjacent rollers being in contact along their sides.

In the embodiment shown in Fig. 1, the bearing cup 1 is mounted in a casing 5 that has a cap 6 extending over the outer end of the bearing cup 1, said cap having a central dished portion 7 surrounded by an annular flange 8 that is disposed inside the annulus constituting the locus of the pintles 4. Mounted in the other or inner end of the casing 5 is a washer 9 that has its inner portion 10 conically shaped to be engaged by the conical ends 3 of the rollers inwardly of their axes. Thus, the rollers 2 are held in the cup by said washer 9 and by the annular flange 8 in said cap.

Preferably, a closure ring 11 of felt or the like is mounted in the casing 5 against said washer 9 and a metal retainer ring 12 for said felt ring is mounted therebeyond. The end of the casing 5 is provided with an inwardly extending flange 13 to hold the washer, the felt ring 11 and the retainer ring 12 in place. In Fig. 1, the bearing is shown mounted on the pin 14 of a universal joint, said pin terminating in the bearing short of the dished end of said casing 5. Said pin 14 has a conical portion 15 constituting the inner raceway for said rollers 2. At the end of said raceway 15 said pin is provided with a conical shoulder 16 that is engaged by the conical portion 10 of said washer 9. Thus, said shoulder 16 backs up said washer 9 and enables it to take the end thrust of said rollers.

In Fig. 2, a similar bearing is shown as mounted on a shaft that extends through the bearing, the central disk portion of the casing cap 5 being omitted, so as to form an opening 20 through which a portion 21 of the shaft extends.

In Fig. 4 is illustrated a modification wherein the body of the casing is omitted, only those portions being kept that cooperate directly with the rollers. In this construction, a disk 30 is secured in a rabbet 31 in the cup, said disk having a central dished portion 32 and an annular flange 33 that retains the small ends of the rollers 2. In this embodiment, the pintles are omitted and the annular flange 33 is shown as overlapping the ends 34 of the rollers themselves. At the other end of the cup a sleeve 35 is mounted in a rabbet 36 in the outer periphery of the cup, said sleeve containing the thrust washer 9, the felt ring 11 and the retainer ring 12 and having a flange 37 at its end holding the parts together.

Obviously the above described cup and roller assembly may be shipped ready for installation and it may easily be assembled on its mounting pin or shaft. The oil and dust closure members, as well as the bearing members themselves, are properly mounted in the original assembly. A full series of rollers may be used and the customary spacing cage between rollers is not required. The casing may be made of any suitable steel, such as S. A. E. 1045, which is hard enough to keep its shape and avoid peening effect but is not too hard to form. The thrust washer may be made of some such material as spring steel, which is hard enough to withstand the end thrust load of the rollers without wearing excessively. The retainer for the felt closure ring is made of some such material as soft steel.

Obviously, numerous changes may be made without departing from the invention and I do not wish to be limited to the precise construction shown.

What I claim is:

1. A taper roller bearing assembly comprising an outer bearing member having a conical raceway therein, a full series of conical rollers in said bearing member, said rollers having conical large ends and having pintles at their small ends, a casing for said outer bearing member, said casing having an inwardly projecting flange at the small end of said outer bearing member extending around the inner periphery of the ring formed by said pintles and a washer in said casing adjacent to the large end of said outer bearing member having a conical portion fitting the conical large ends of said rollers inwardly of their axes from said outer bearing member, whereby said rollers and said outer bearing member constitute a self-contained unit.

2. A taper roller bearing comprising a shaft or the like having a conical shoulder and a conical raceway portion extending therefrom, taper bearing rollers mounted on said raceway, said rollers having conical large ends, a bearing cup for said rollers, a thrust washer engaged by the large ends of said rollers, means for holding said washer in proper position at the ends of said rollers, said washer abutting against said shoulder, and means associated with said cup having an annular flange disposed within the circle constituting the locus of portions of the small ends of the rollers.

3. A taper roller bearing assembly comprising an outer bearing member having a conical raceway therein, a full series of conical rollers therein, a casing for said outer bearing member, a washer in said casing engaging portions of the large ends of said rollers, said casing having a flange overlapping portions of the small ends of said rollers, a closure ring beyond said washer in said casing and a retainer ring for said closure ring, said casing having an inwardly disposed end flange overlapping said retainer ring.

4. A taper roller bearing comprising a shaft or the like having a conical shoulder and a conical raceway portion extending therefrom, taper bearing rollers mounted on said raceway, said rollers having conical large ends and pintles on their small ends, a bearing cup for said rollers, a casing for said cup, and a thrust washer in said casing engaged by the large ends of said rollers, said washer abutting against said shoulder, and said casing having an annular flange disposed within the circle constituting the locus of said pintles.

5. A taper roller bearing comprising a shaft or the like having a conical shoulder and a conical raceway portion extending therefrom, taper bearing rollers mounted on said raceway, said rollers having conical large ends and pintles on their small ends, a bearing cup for said rollers, a casing for said cup, a thrust washer in said casing engaged by the large ends of said rollers, said washer abutting against said shoulder, and said casing having an annular flange disposed within the circle constituting the locus of said pintles, a closure ring in said casing beyond said thrust washer and a retainer ring for said closure ring, said casing having a flange overlapping said retainer ring.

6. A taper roller bearing comprising a shaft or the like having a conical shoulder and a conical raceway portion extending therefrom, taper bearing rollers mounted on said raceway, said rollers having conical large ends and pintles on their small ends, a bearing cup for said rollers, a thrust washer engaged by the large ends of said rollers, means for holding said washer in proper position at the ends of said rollers, said washer abutting against said shoulder, and means associated with said cup having an annular flange disposed within the circle constituting the locus of said pintles.

TRACY V. BUCKWALTER.